US008611593B2

(12) United States Patent
Chen et al.

(10) Patent No.: US 8,611,593 B2
(45) Date of Patent: Dec. 17, 2013

(54) FOREGROUND OBJECT DETECTION SYSTEM AND METHOD

(75) Inventors: Chien-Lin Chen, Taipei Hsien (TW); Chih-Cheng Yang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 588 days.

(21) Appl. No.: 12/870,860

(22) Filed: Aug. 30, 2010

(65) Prior Publication Data

US 2011/0228978 A1 Sep. 22, 2011

(30) Foreign Application Priority Data

Mar. 18, 2010 (TW) ................................ 99108067 A

(51) Int. Cl.
*G06K 9/00* (2006.01)
(52) U.S. Cl.
USPC ........... 382/103; 382/190; 382/255; 382/264; 382/284; 382/309

(58) Field of Classification Search
USPC .................. 382/103, 190, 255, 264, 284, 309
See application file for complete search history.

(56) References Cited

U.S. PATENT DOCUMENTS

| 6,731,799 B1 * | 5/2004 | Sun et al. ...................... 382/173 |
| 2003/0107649 A1 * | 6/2003 | Flickner et al. ............... 348/150 |
| 2008/0181507 A1 * | 7/2008 | Gope et al. ..................... 382/190 |
| 2011/0280478 A1 * | 11/2011 | Chen et al. ..................... 382/165 |

\* cited by examiner

*Primary Examiner* — Wesley Tucker
(74) *Attorney, Agent, or Firm* — Altis Law Group, Inc.

(57) ABSTRACT

A foreground object detection system and method establishes a background model by reading N frames of a video stream generated by a camera. The detection system further reads each frame of the video stream, detects the pixel value difference and the brightness value difference for each pair of two corresponding pixels of two consecutive frames for each of the N frames of the video stream. In detail, by comparing the pixel value difference with a pixel threshold and by comparing the brightness value difference with a brightness threshold, the detection system may determine a foreground or background pixel.

16 Claims, 4 Drawing Sheets

FOREGROUND OBJECT DETECTION SYSTEM AND METHOD

BACKGROUND

1. Technical Field

Embodiments of the present disclosure generally relate to image processing, and more particularly to a foreground object detection system and method.

2. Description of Related Art

Foreground tracking methods are well known and popularly used in monitoring systems. However, changes in a monitored area may be falsely identified as background objects, such as moving backgrounds (i.e., movement of leaves on a plant), shadows, highlights, and illumination changes.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the data "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
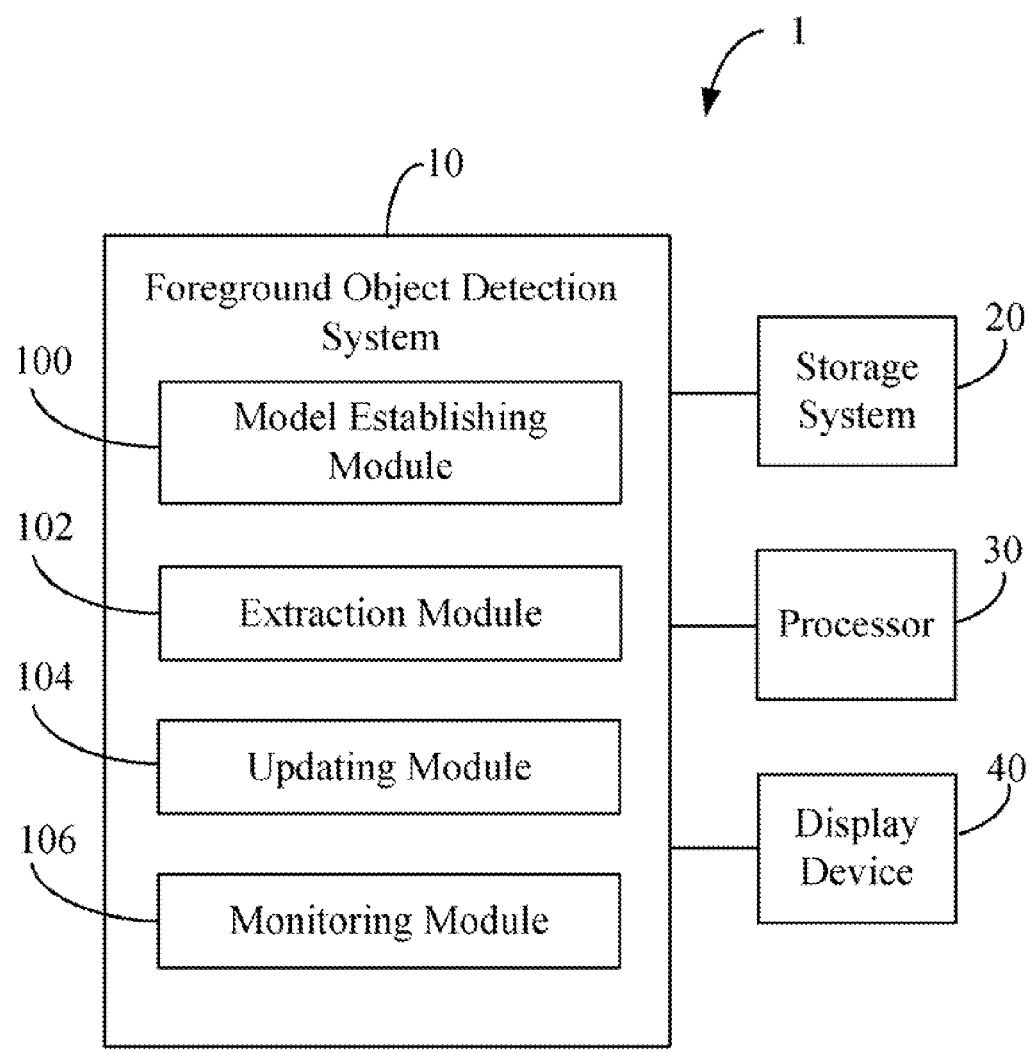
FIG. 1 is a block diagram of one embodiment of a foreground object detection system installed in an electronic device.

FIG. 1 is a schematic diagram of one embodiment of an electronic device 1. In the embodiment, the electronic device 1 may include a foreground object detection system 10, a storage system 20, at least one processor 30, and a display device 40. The detection system 10 may detect foreground objects in a digital video stream including at least one frame. In some embodiments, the video stream is generated by a camera for monitoring an area. One or more computerized codes of the detection system 10 are stored in the storage system 20 and executed by the at least one processor 30. The display device 40 is operable to display the video stream.

In one embodiment, the storage system 20 may be a magnetic or an optical storage system, such as a hard disk drive, an optical drive, or a tape drive. The storage system 20 also stores the video of the area captured by the electronic device 1. The display device 40 may be a display screen, such as a liquid crystal display (LCD) or a cathode-ray tube (CRT) display.

In one embodiment, the detection system 10 includes a model establishing module 100, an extraction module 102, an updating module 104, and a monitoring module 106. Each of the modules 100-106 may be a software program including one or more computerized instructions that are stored in the storage system 20 and executed by the processor 30.

The model establishing module 100 establishes a blank model to receive a first frame of N frames of a video stream, and then generates a background model. In the embodiment, the blank model is a blank frame.

The extraction module 102 reads a current frame of the video stream and then detects a pixel value difference and a brightness value difference for each pair of two corresponding pixels in the background model and the current frame for each of the N frames of the video stream.

Figure 3:
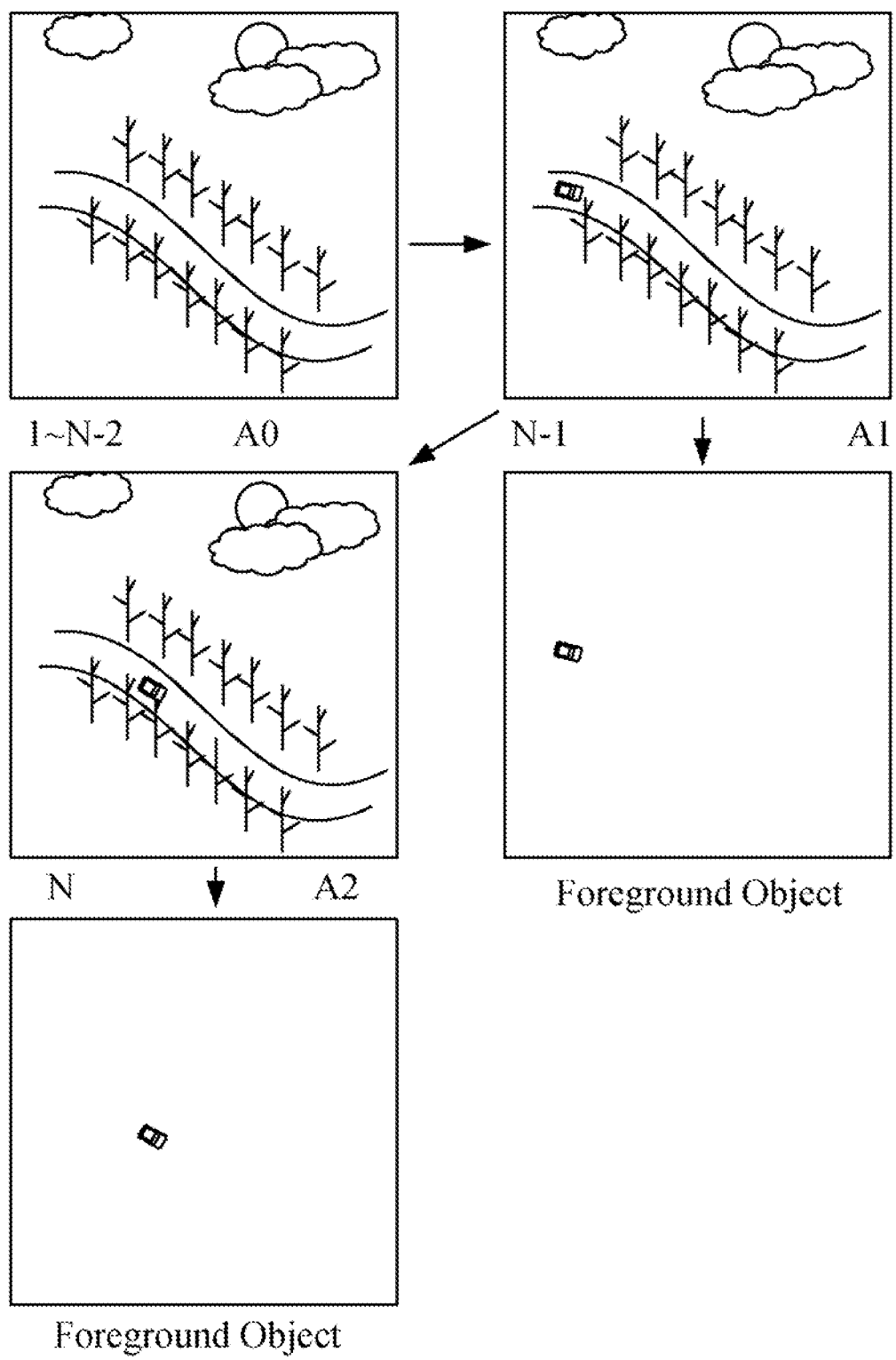
FIG. 3 is an example illustrating detected foreground objects.

In some embodiments, if both of the pixel value difference and the brightness value difference are less than or equal to a pixel threshold and a brightness threshold, respectively, the pixel in the current frame is determined as a background pixel. It is understood that values of the pixel threshold and the brightness threshold may be adjusted. For the background pixel in the current frame, the updating module 104 updates the background model by adding the background pixel to the background model. In one example, as illustrated in FIG. 3, the background model (denoted as "A0") is established by frames 1 to frames (N-2). After background pixels are detected in the frame (N-1), the background model A0 is updated to be background model A1. For detecting the foreground object of the frame N, the extracting module 102 detects a pixel value difference and a brightness value difference for each pair of two corresponding pixels in the background model A1 and the frame N.

If any one or two of the pixel value difference and the brightness value difference are greater than the pixel threshold and the brightness threshold, respectively, the pixel in the current frame is determined as a foreground pixel.

It is understood that the extraction module 102 continuously reads each of the N frames of the video stream, and detects the foreground object in each frame of the video stream by detecting the pixel value difference and the brightness value difference for each pair of two corresponding pixels of two consecutive frames after the current frame as mentioned above. The foreground object is defined by one or more foreground pixels.

For example, after the current frame, the extraction module 102 reads a next current frame and detects a pixel value difference and a brightness value difference for each pair of two corresponding pixels in the background model and the next current frame. In one example, as illustrated in FIG. 3, the background model (denoted as "A1") is a background model established by frames 1 to frames (N-1). After detecting a pixel value difference and a brightness value difference for each pair of two corresponding pixels in the background model A1 and the frame N, the background model A1 is updated to be background model A2. In addition, the foreground object (i.e., a car) is also identified.

Upon determining at least one foreground pixel in the current frame, foreground pixels in the current frame located in close proximity are determined as one foreground object. For example, the extracting model 102 reads the frame N and determines the car, as shown in background model A2 in FIG. 3, as the foreground object. It is understood that one frame may have one or more foreground objects.

In response to a determination of the foreground object in each frame of the video stream, the updating module 104 temporarily stores the foreground object and the background model as a temporary background model. The monitoring module 106 detects if the foreground object have appeared in one or more consecutive frames after the current frame for a determined time period. If the foreground object has appeared in one or more consecutive frames after the current frame for the determined time period, the updating module 104 updates the background model with the temporary background model. In some embodiments, the time period may be adjusted.

Figure 4:
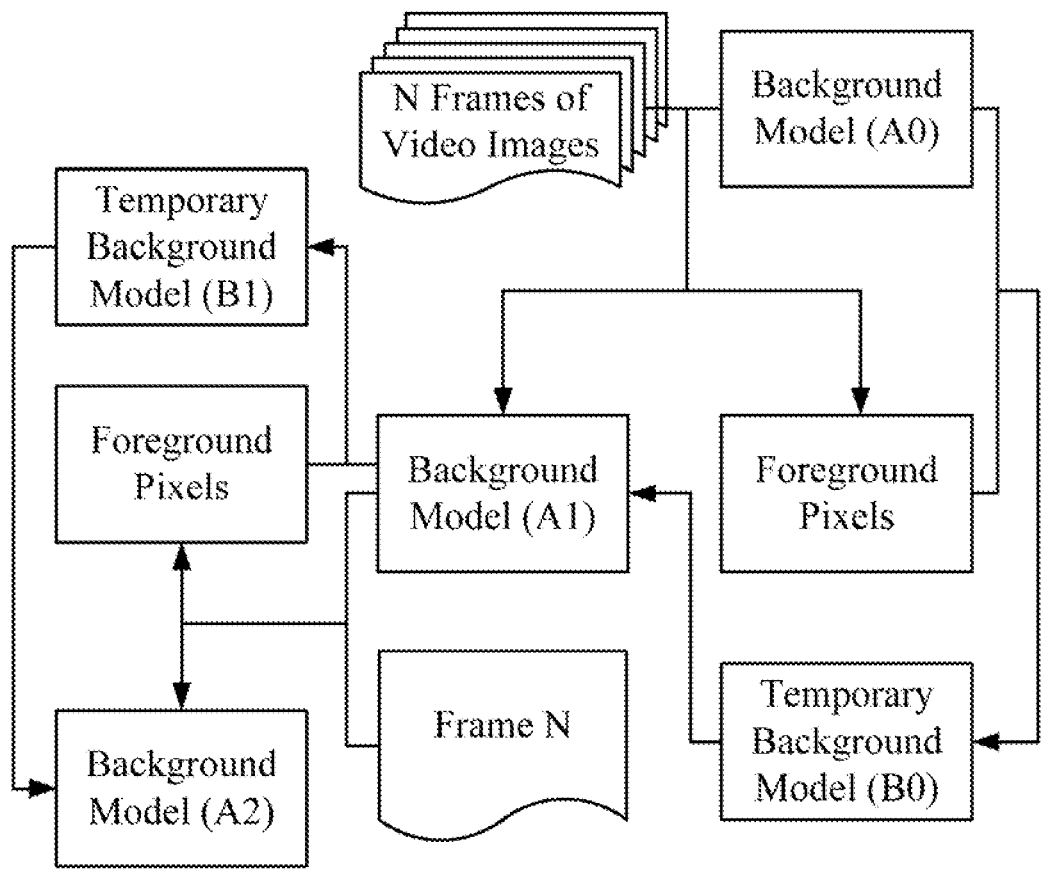
FIG. 4 is a schematic diagram illustrating the relationship between the background model and the temporary background model.

As shown in FIG. 4, if the foreground object has not appeared in one or more consecutive frames after the current frame for the determined time period, the monitoring module 106 keeps monitoring the temporary background model.

Figure 2:
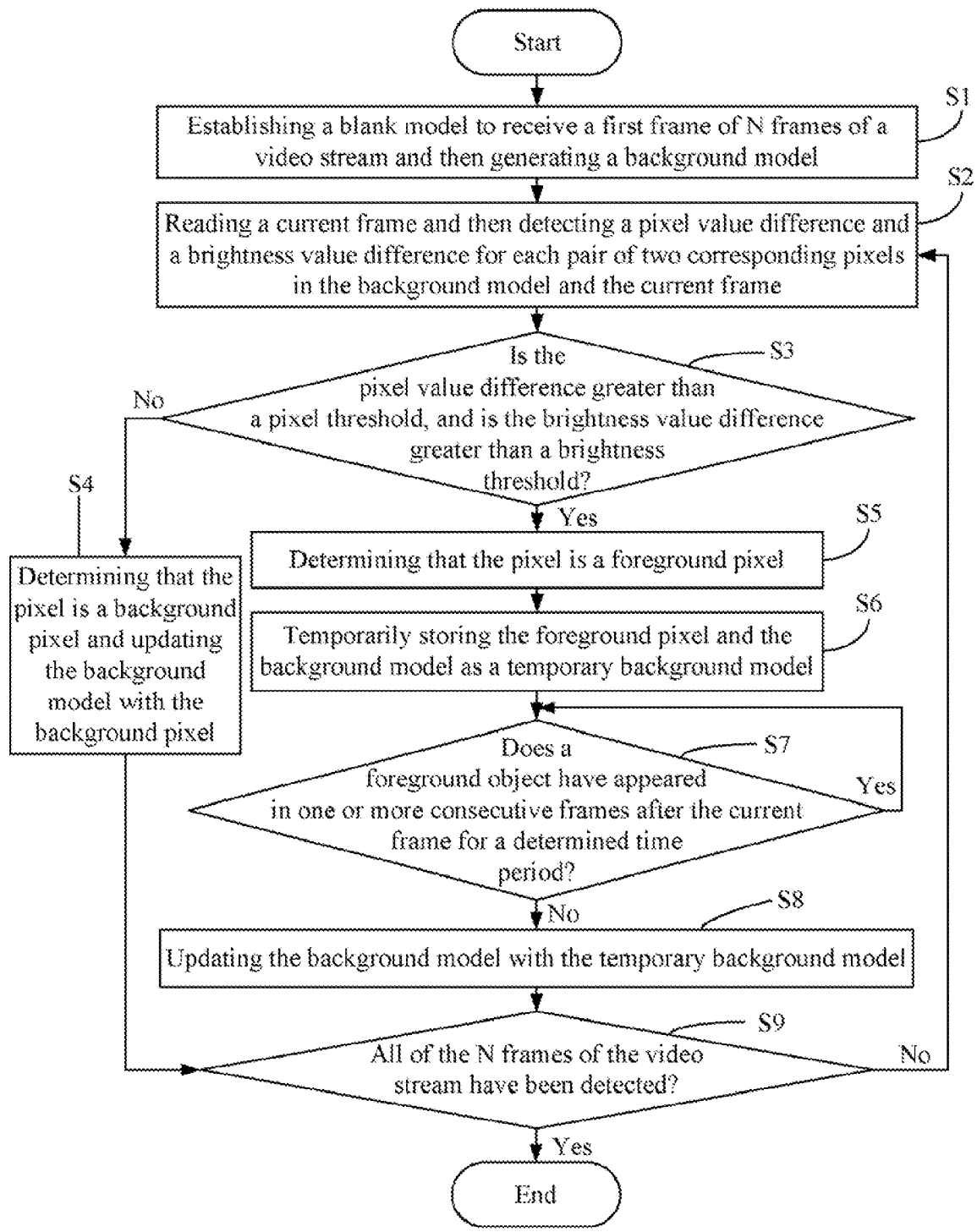
FIG. 2 is a flowchart illustrating one embodiment of a foreground object detection method using the foreground object detection system of FIG. 1.

FIG. 2 is a flowchart illustrating one embodiment of a foreground object detection method using the detection system 10 of FIG. 1. Depending on the embodiment, additional blocks may be added, others removed, and the ordering of the blocks may be changed.

In block S1, the model establishing module 100 establishes a blank model to receive a first frame of N frames of the video stream, and then generates a background model. In the embodiment, the blank model is a blank frame.

In block S2, the extraction module 102 reads a current frame (i.e., a second frame of the N frames of the video stream) of the video stream and then detects a pixel value difference and a brightness value difference for each pair of two corresponding pixels in the background model and the current frame.

In block S3, the extraction module 102 determines whether the pixel value difference and the brightness value difference are greater than a pixel threshold and a brightness threshold, respectively. If both of the pixel value difference and the brightness value difference are less than or equal to a pixel threshold and a brightness threshold, respectively, the flow goes to block S4. If any one or two of the pixel value difference and the brightness value difference are greater than the pixel threshold and the brightness threshold, respectively, the flow goes to block S5.

In block S4, the extraction module 102 determines that the pixel in the current frame is a background pixel. The updating module 104 updates the background model with the background pixel, and the flow goes to block S9.

In block S5, the extraction module 102 determines that the pixel in the current frame is a foreground pixel. Upon determining at least one foreground pixel in the current frame, foreground pixels in the current frame located in close proximity are determined as one foreground object in the current frame. It is understood that one frame may have one or more than one foreground objects.

In block S6, the updating module 104 temporarily stores the foreground pixel and the background model as a temporary background model.

In block S7, the monitoring module 106 monitors the temporary background model, and determines if the foreground object has appeared in one or more consecutive frames after the current frame for a determined time period.

If the foreground object has appeared in one or more consecutive frames after the current frame for the determined time period, in block S8, the updating module 104 updates the background model with the temporary background model.

If the foreground object has not appeared in one or more consecutive frames after the current frame for the determined time period, in block S7, the monitoring module 106 keeps monitoring the temporary background model.

In block S9, the extraction module 102 determines whether all of the N frames of the video stream have been detected. If any one of the N frames has not been detected, the flow returns to block S3. The extraction module 102 reads a next current frame and detects a pixel value difference and a brightness value difference for each pair of two corresponding pixels in the background model and the next current frame for each of the N frames of the video stream. If all of the N frames of the video stream have been detected, the flow ends.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A foreground object detection method, the method comprising:

establishing a background model by establishing a blank model to receive the first frame of N frames of a video stream generated by a camera;

reading a current frame of the N frames and detecting a pixel value difference and a brightness value difference for each pair of two corresponding pixels in the background model and the current frame for each of the N frames of the video stream, wherein the current frame is selected in sequence from the second frame to the N frames of the video stream;

determining a foreground pixel in the current frame upon the condition that the pixel value difference and the brightness value difference of the pixel in the current frame are greater than a pixel threshold and a brightness threshold, respectively; and identifying a foreground object in the current frame in accordance with the foreground pixel.

2. The method as described in claim 1, further comprising a storing step after the determining step, the storing step comprising:

temporarily storing the foreground pixel and the background model as a temporary background model.

3. The method as described in claim 2, further comprising:

updating the background model with the temporary background model upon the condition that the foreground object has appeared in one or more consecutive frames after the current frame for a determined time period.

4. The method as described in claim 2, wherein foreground pixels in the current frame located in close proximity are determined as a foreground object.

5. The method as described in claim 1, further comprising:

determining a background pixel in the current frame, and updating the background model by adding the background pixel to the background model, upon the condition that both of the pixel value difference and the brightness value difference are less than or equal to a pixel threshold and a brightness threshold, respectively;

updating the background model by adding the background pixel to the background model; and reading a next current frame and detecting a pixel value difference and a brightness value difference for each pair of two corresponding pixels in the updated background model and the next current frame.

6. A foreground object detection system of an electronic device, the system comprising:

a model establishing module operable to establish a blank model to receive a first frame of N frames of a video stream to generate a background model;

an extraction module operable to read a current frame of the video stream and detect a pixel value difference and a brightness value difference for each pair of two corresponding pixels in the background model and the current frame for each of the N frames of the video stream, wherein the current frame is selected in sequence from the second frame to the N frames of the video stream; and the extraction module further operable to determine a foreground pixel in the current frame upon the condition that the pixel value difference and the brightness value difference of the pixel in the current frame are greater than a pixel threshold and a brightness threshold, respectively, and to identify a foreground object in the current frame in accordance with the foreground pixel.

7. The system as described in claim 6, further comprising an updating module operable to temporarily store the foreground pixel and the background model as a temporary background model.

8. The system as described in claim 7, further comprising a monitoring module operable to detect if the foreground object has appeared in one or more consecutive frames after the current frame for a determined time period.

9. The system as described in claim 8, wherein the updating module is further operable to update the background model with the temporary background model if the foreground object has appeared in one or more consecutive frames after the current frame for the determined time period.

10. The system as described in claim 7, wherein foreground pixels in the current frame located in close proximity are determined as a foreground object.

11. The system as described in claim 7, wherein the extracting module is further operable to determine a background pixel in the current frame upon the condition that both of the pixel value difference and the brightness value difference are less than or equal to a pixel threshold and a brightness threshold, respectively.

12. A non-transitory storage medium having stored thereon instructions that, when executed by a processor of an electronic device, cause the electronic device to perform a foreground object detection method, the method comprising:

establishing a background model by establishing a blank model to receive the first frame of N frames of a video stream generated by a camera;

reading a current frame of the N frames and detecting a pixel value difference and a brightness value difference for each pair of two corresponding pixels in the background model and the current frame for each of the N frames of the video stream, wherein the current frame is selected in sequence from the second frame to the N frames of the video stream;

determining a foreground pixel in the current frame upon the condition that the pixel value difference and the brightness value difference of the pixel in the current frame are greater than a pixel threshold and a brightness threshold, respectively; and identifying a foreground object in the current frame in accordance with the foreground pixel.

13. The storage medium as described in claim 12, wherein the method further comprises a storing step after the determining step, the storing step comprising:

temporarily storing the foreground pixel and the background model as a temporary background model.

14. The storage medium as described in claim 13, wherein the method further comprises:

updating the background model with the temporary background model upon the condition that the foreground object has appeared in one or more consecutive frames after the current frame for a determined time period.

15. The storage medium as described in claim 13, wherein foreground pixels in the current frame located in close proximity are determined as a foreground object.

16. The storage medium as described in claim 12, wherein the method further comprises:

determining a background pixel in the current frame, and updating the background model by adding the background pixel to the background model, upon the condition that both of the pixel value difference and the brightness value difference are less than or equal to a pixel threshold and a brightness threshold, respectively;

updating the background model by adding the background pixel to the background model; and reading a next current frame and detecting a pixel value difference and a brightness value difference for each pair of two corresponding pixels in the updated background model and the next current frame.

* * * * *